United States Patent
Kato (10) Patent No.: US 9,556,843 B2
(45) Date of Patent: Jan. 31, 2017

(54) FUEL INJECTION NOZZLE

(71) Applicant: DENSO CORPORATION, Kariya, Aichi-pref. (JP)

(72) Inventor: Masaaki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 353 days.

(21) Appl. No.: 14/153,559

(22) Filed: Jan. 13, 2014

(65) Prior Publication Data

US 2014/0216405 A1 Aug. 7, 2014

(30) Foreign Application Priority Data

Feb. 5, 2013 (JP) .................................. 2013-20949

(51) Int. Cl.
| | | |
|---|---|---|
| *F02M 69/04* | (2006.01) | |
| *F02M 61/18* | (2006.01) | |
| *F02M 53/02* | (2006.01) | |
| *F02M 21/02* | (2006.01) | |

(52) U.S. Cl.
CPC ..... *F02M 61/1806* (2013.01); *F02M 21/0212* (2013.01); *F02M 21/0248* (2013.01); *F02M 53/02* (2013.01); *F02M 61/184* (2013.01); *F02M 61/1826* (2013.01); *F02M 61/1833* (2013.01); *Y02T 10/32* (2013.01)

(58) Field of Classification Search
CPC ................ F02M 61/1806; F02M 53/02; F02M 2200/953
USPC .................. 123/445; 239/533.2, 533.12, 584
See application file for complete search history.

(56) References Cited

U.S. PATENT DOCUMENTS

| | | | | |
|---|---|---|---|---|
| 4,177,948 A | * | 12/1979 | Schaffitz | ............ F02M 61/1806 239/533.3 |
| 4,566,634 A | * | 1/1986 | Wiegand | ................ F02M 57/00 123/585 |
| 4,657,829 A | | 4/1987 | McElroy et al. | |
| 5,645,225 A | * | 7/1997 | Hasegawa | .............. F02M 61/18 239/533.12 |
| 5,860,394 A | * | 1/1999 | Saito | ...................... F02M 53/08 123/41.31 |

(Continued)

FOREIGN PATENT DOCUMENTS

| | | |
|---|---|---|
| JP | 63-201315 | 8/1988 |
| JP | 5-202826 | 8/1993 |

(Continued)

OTHER PUBLICATIONS

Office Action (3 pages) dated Feb. 3, 2015, issued in corresponding Japanese Application No. 2013-020949 and English translation (4 pages).

*Primary Examiner* — Marguerite McMahon
*Assistant Examiner* — James Kim
(74) *Attorney, Agent, or Firm* — Nixon & Vanderhye P.C.

(57) ABSTRACT

A fuel injection nozzle includes: a nozzle body having a plurality of injection holes; and a needle accommodated in the nozzle body to inject a DME fuel containing dimethyl ether as a main component. The nozzle body has a seat part to which the needle seated or from which the needle separated, and a tip end chamber arranged downstream of the seat part in a flow of the DME fuel to communicate with the plurality of injection holes. The DME fuel in the tip end chamber is heated with combustion heat in a combustion chamber of an internal combustion engine to have a supercritical state.

6 Claims, 8 Drawing Sheets (56) References Cited

U.S. PATENT DOCUMENTS

| | | | | |
|---|---|---|---|---|
| 6,047,904 | A * | 4/2000 | Sugimoto | F02M 61/184 239/533.12 |
| 6,520,145 | B2 * | 2/2003 | Hunkert | F02M 61/1833 123/305 |
| 6,644,565 | B2 * | 11/2003 | Hockenberger | F02M 61/1833 239/533.12 |
| 6,708,905 | B2 * | 3/2004 | Borissov | F02B 43/00 123/527 |
| 7,488,357 | B2 * | 2/2009 | Tavlarides | C10L 1/026 44/300 |
| 8,197,558 | B2 | 6/2012 | Tavlarides et al. | |
| 2006/0102742 | A1 * | 5/2006 | Rigney | F02M 53/06 239/88 |
| 2007/0095952 | A1 * | 5/2007 | Heinstein | F02M 51/0671 239/585.1 |
| 2009/0020631 | A1 * | 1/2009 | Mashida | F02D 19/10 239/533.3 |
| 2010/0236526 | A1 * | 9/2010 | Wang | F02M 51/0671 123/456 |

FOREIGN PATENT DOCUMENTS

| | | |
|---|---|---|
| JP | 5-296123 | 11/1993 |
| JP | 2002-161827 | 6/2002 |
| JP | 2005-299642 | 10/2005 |
| JP | 2005-330915 | 12/2005 |
| JP | 2008-045463 | 2/2008 |
| JP | 2009-180132 | 8/2009 |
| JP | 2012-122369 | 6/2012 |

* cited by examiner

FUEL INJECTION NOZZLE

CROSS REFERENCE TO RELATED APPLICATION

This application is based on Japanese Patent Application No. 2013-20949 filed on Feb. 5, 2013, the disclosure of which is incorporated herein by reference in its entirety.

TECHNICAL FIELD

The present disclosure relates to a fuel injection nozzle.

BACKGROUND

Supercritical injection is used in a diesel engine to prevent ignition delay which is caused by evaporation latent heat generated in liquid phase injection. Furthermore, there is a merit that a mass-based injection rate can be made higher in the supercritical injection than in gas phase injection.

In U.S. Pat. Nos. 7,488,357 B2 and 8,197,558 B2, fuel containing light-oil as a main component and inactive gas such as exhaust gas or liquid $CO_2$ is heated to have a supercritical state, and is supplied to an injector. In this case, the fuel can be injected in the supercritical state, preventing a caulking.

However, in order to make the fuel into the supercritical state from the liquid phase, a very high temperature is required, so large-scale complicated heating system is used to provide the supercritical state before supplying to the injector. Moreover, the system becomes further complicated since a fuel mixture equipment is provided for preventing the caulking in U.S. Pat. Nos. 7,488,357 B2 and 8,197,558 B2.

Moreover, U.S. Pat. Nos. 7,488,357 B2 and 8,197,558 B2 are difficult to be applied to a DME fuel mainly containing dimethyl ether (DME) because a phase change is easily generated in the DME fuel.

SUMMARY

It is an object of the present disclosure to provide a fuel injection nozzle which can inject DME fuel to a combustion chamber in a supercritical state.

According to the present disclosure, a fuel injection nozzle includes a nozzle body having plural injection holes, and a needle accommodated in the nozzle body to open and close the injection holes. The fuel injection nozzle injects DME fuel mainly containing dimethyl ether to a combustion chamber of an internal combustion engine.

The nozzle body has a seat part to which the needle is seated or from which the needle is separated, and a tip end chamber arranged downstream of the seat part in a flow of the DME fuel to communicate with the injection holes. The DME fuel of the tip end chamber is heated with combustion heat in the combustion chamber to have a supercritical state.

The DME fuel will be in the supercritical state at a low temperature compared with a fuel mainly containing light oil. The DME fuel of the tip end chamber is made into the supercritical state by the combustion heat transmitted from the combustion chamber. Thereby, the DME fuel is made into the supercritical state immediately before the injection, so the DME fuel can be certainly injected in the supercritical state although a phase change is easily generated in the DME fuel. Further, an additional heat source is not necessary because the DME fuel is made into the supercritical state using the combustion heat, so a large-scale system is unnecessary.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A fuel injection nozzle 1 according to a first embodiment is explained with reference to FIGS. 1-7B. The fuel injection nozzle 1 is used for an injector 3 which is mounted to a fuel injection device 2 for a diesel engine. Fuel for the diesel engine is DME fuel which contains dimethyl ether (DME) as main component.

Figure 1:
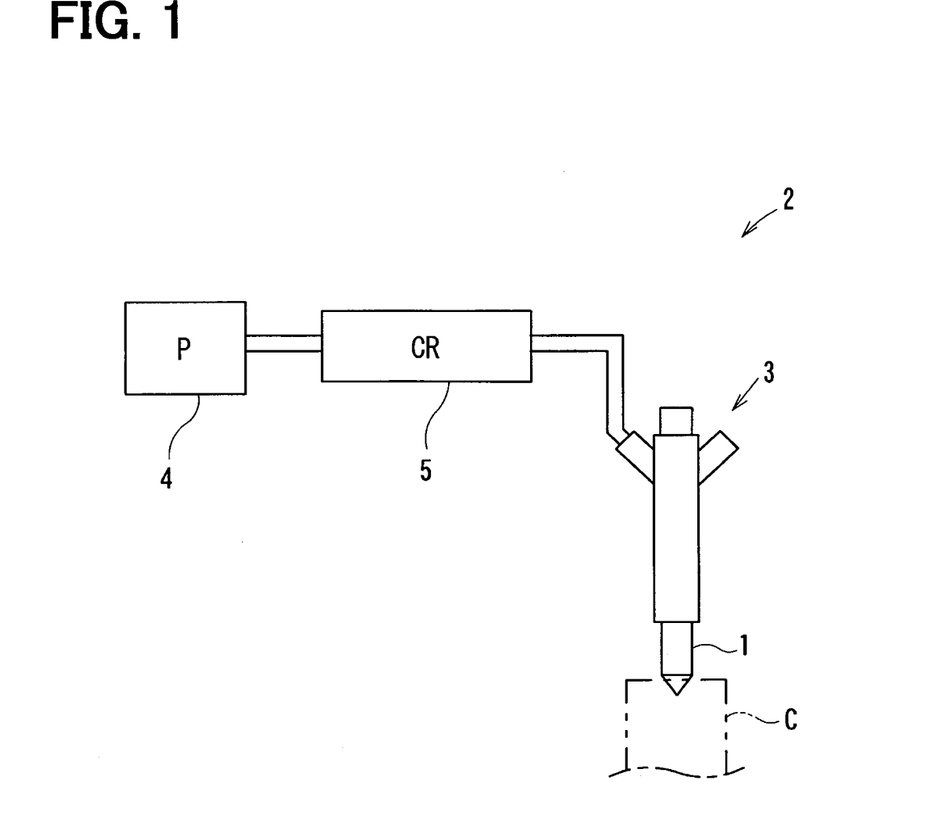
FIG. 1 is a schematic view illustrating a fuel injection device according to a first embodiment.

The fuel injection device 2 includes a common-rail 5 which accumulates fuel discharged from a high-pressure pump 4 in high pressure state, and the injector 3 which injects the high pressure fuel accumulated in the common-rail 5 into a combustion chamber C of an internal combustion engine.

The high-pressure pump 4 pumps fuel from a fuel tank (not shown), and pressurizes and discharges the fuel in a manner that the fuel is stored in the common-rail 5 with a target pressure according to a state of the internal combustion engine.

The common-rail 5 is connected with a discharge port of the high-pressure pump 4 through a high-pressure piping. The common-rail 5 receives the pressurized fuel, and stores the fuel in the high pressure state. The common-rail 5 is further connected to an inlet of the injector 3 through a high-pressure piping, and supplies the fuel to the injector 3. That is, the common-rail 5 works as a pressure accumulating container which accumulates the high-pressure fuel, and works as a distribution container which distributes the high-pressure fuel to the injector 3.

The injector 3 includes the fuel injection nozzle 1 and an electromagnetic actuator which actuates the fuel injection nozzle 1. The fuel injection nozzle 1 communicates with the common-rail 5 through the high-pressure piping, and injects fuel to the combustion chamber C. The fuel injection device 2 may have the injector 3 plurally corresponding to the number of cylinders in the internal combustion engine, and FIG. 1 illustrates only one of the injectors.

Figure 2:
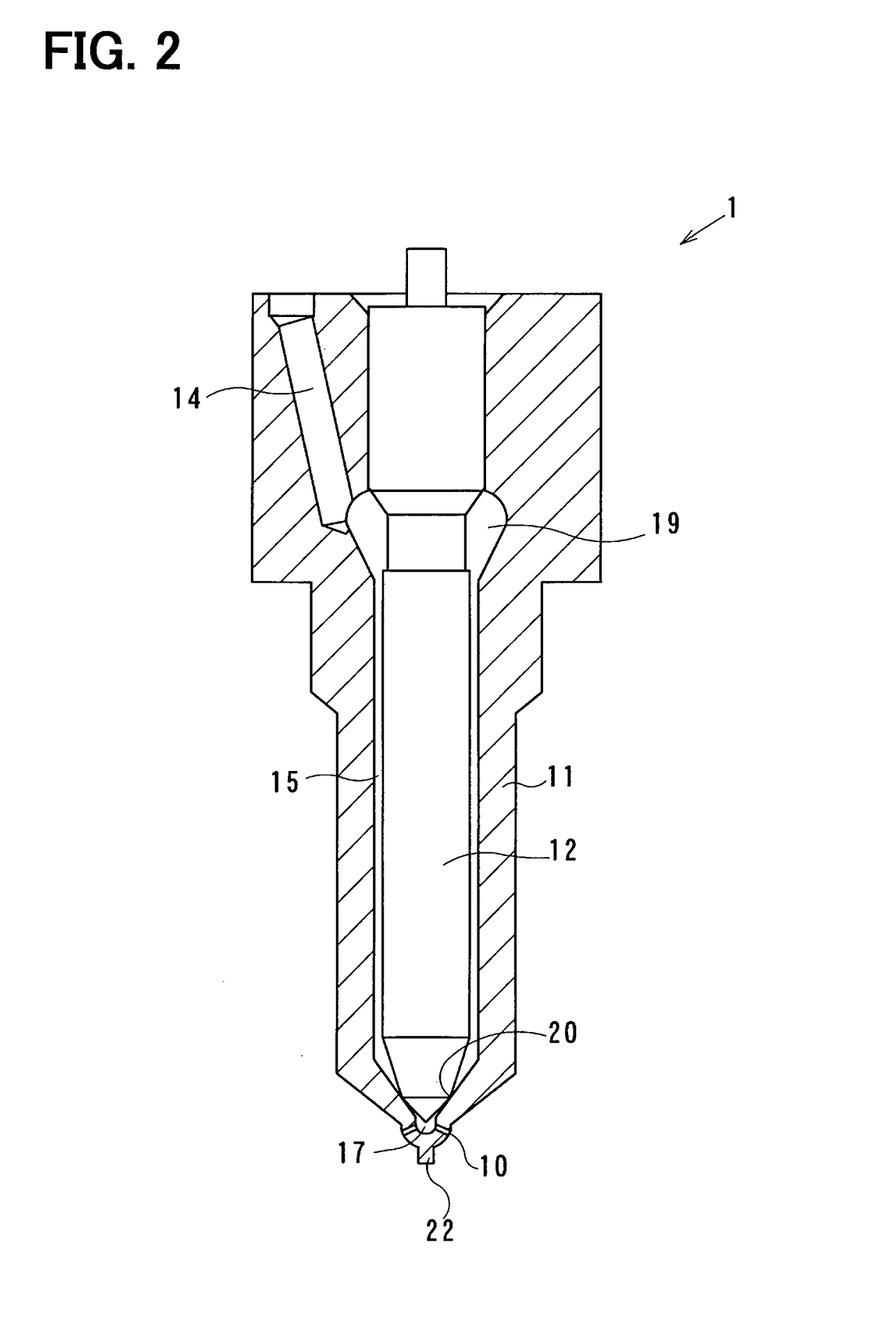
FIG. 2 is a schematic sectional view illustrating a fuel injection nozzle of the fuel injection device of the first embodiment.

As shown in FIG. 2, the fuel injection nozzle 1 includes a nozzle body 11 which has plural injection holes 10, and a needle 12 accommodated in the nozzle body 11 to open and close the injection holes 10. The nozzle body 11 further has a fuel passage 14 for supplying fuel, a guide hole 15, and a tip end chamber 17. The guide hole 15 communicates with the fuel passage 14, and the needle 12 is disposed in the guide hole 15. The tip end chamber 17 communicates with the guide hole 15, and the injection holes 10 communicate with the tip end chamber 17.

A fuel storing chamber 19 is defined in the middle of the guide hole 15. An inner diameter of the fuel storing chamber 19 is larger than that of the guide hole 15. The fuel passage 14 communicates with the fuel storing chamber 19, and introduces high-pressure fuel into the fuel storing chamber 19.

The nozzle body 11 has a seat part 20 to which the needle 12 is seated or from which the needle 12 is separated. The seat part 20 is arranged downstream of the fuel storing chamber 19 of the guide hole 15 in a flow of the DME fuel.

The tip end chamber 17 is arranged downstream of the seat part 20 in the flow of the DME fuel, and is located adjacent to a tip end of the nozzle body 11. The tip end chamber 17 communicates with the injection holes 10, and communicates with the combustion chamber C through the injection holes 10.

When the needle 12 is seated to be in contact with the seat part 20, the injection holes 10 are closed. When the needle 12 is lifted up and separated from the seat part 20, the injection holes 10 are opened.

The fuel injection nozzle 1 has a heat receiving portion 22 projected from the tip end of the nozzle body 11 toward the combustion chamber C. The heat receiving portion 22 receives the combustion heat from the combustion chamber C, and transmits the combustion heat to the tip end chamber 17. The DME fuel in the tip end chamber 17 is heated with the combustion heat transmitted from the heat receiving portion 22 so as to have a supercritical state.

Figure 3:
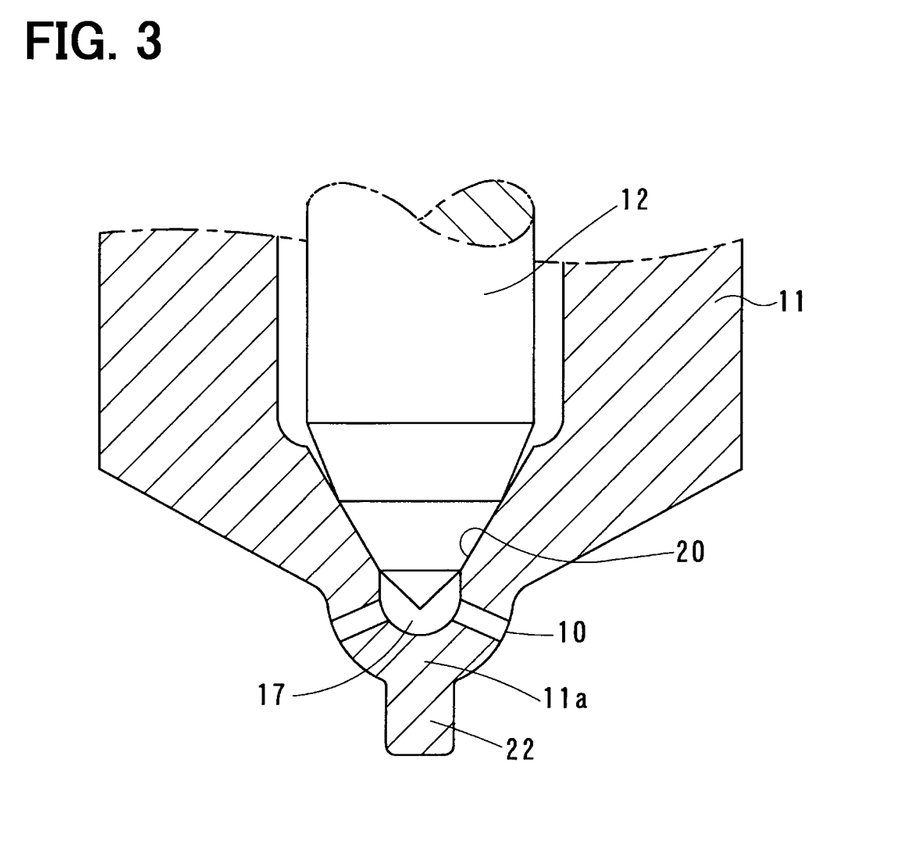
FIG. 3 is an enlarged sectional view illustrating a tip end of the fuel injection nozzle of the first embodiment.

The heat receiving portion 22 is integrally formed with the nozzle body 11 as one-piece element. For example, as shown in FIG. 3, a wall of the nozzle body 11 which defines the tip end chamber 17 has a tip end part 11a, and the heat receiving portion 22 is projected from the tip end part 11a to have a solid cylindrical shape. That is, the heat receiving portion 22 is located further on the tip end side than the injection holes 10 opened in the nozzle body 11.

The shape and the size of the heat receiving portion 22 are set in a manner that the temperature of DME fuel in the tip end chamber 17 becomes more than or equal to a critical temperature by the combustion heat transmitted through the heat receiving portion 22 and that the temperature of DME fuel upstream of the seat part 20 is maintained to be in the liquid phase.

Figure 4:
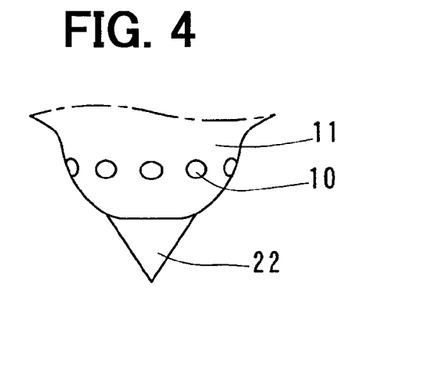
FIG. 4 is an enlarged side view illustrating a modification example of the fuel injection nozzle of the first embodiment.

Alternatively, as shown in FIG. 4, the heat receiving portion 22 may have a cone shape in which the diameter becomes smaller toward the tip end.

Figure 5A:
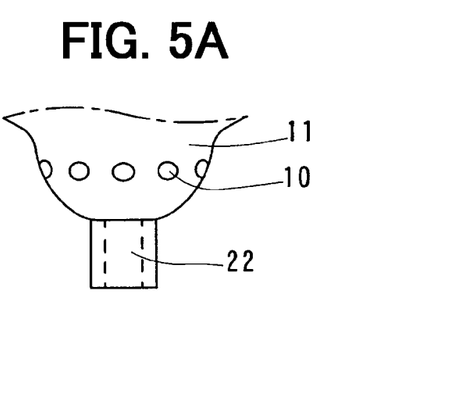
FIG. 5A is an enlarged side view illustrating a modification example of the fuel injection nozzle of the first embodiment.
Figure 5B:
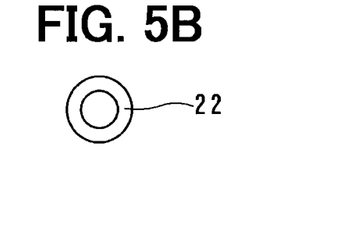
FIG. 5B is a bottom view illustrating a heat receiving portion of the fuel injection nozzle of the first embodiment.

Alternatively, as shown in FIGS. 5A and 5B, the heat receiving portion 22 may have a hollow cylindrical shape.

Figure 6:
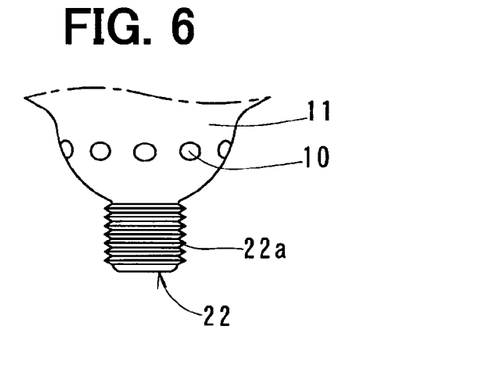
FIG. 6 is an enlarged side view illustrating a modification example of the fuel injection nozzle of the first embodiment.
Figure 7A:
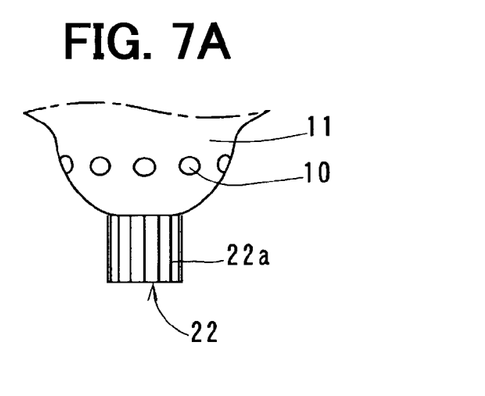
FIG. 7A is an enlarged side view illustrating a modification example of the fuel injection nozzle of the first embodiment.
Figure 7B:
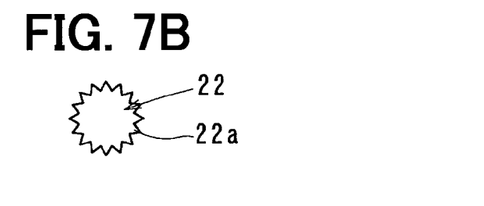
FIG. 7B is a bottom view illustrating a heat receiving portion of the fuel injection nozzle of the first embodiment.

Further, as shown in FIGS. 6 and 7A, the heat receiving portion 22 may have a fin 22a around the outer periphery, in order to efficiently receive the heat, such that the surface area of the heat receiving portion 22 is increased. In FIG. 6, the fin 22a has a flange shape, and a plurality of the fins 22a are arranged in the axial direction of the heat receiving portion 22. In FIGS. 7A and 7B, the fin 22a extends in the axial direction, and a plurality of the fins 22a are arranged in the circumferential direction. In addition, the fin 22a shown in FIG. 6 or 7A may be combined with the heat receiving portion 22 shown in FIG. 4 or FIG. 5A.

Figure 8:
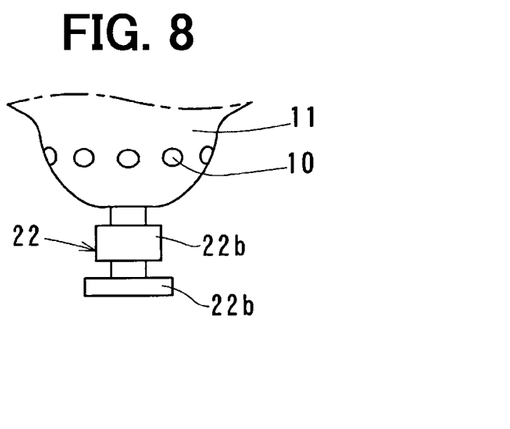
FIG. 8 is an enlarged side view illustrating a modification example of the fuel injection nozzle of the first embodiment.

Moreover, as shown in FIG. 8, a large-diameter flange 22b may be formed at a middle and an axial tip end of the heat receiving portion 22 so as to make it easy to receive the heat.

The DME fuel is able to have a supercritical state at a low temperature compared with light-oil fuel mainly containing light oil. Specifically, the critical temperature of the light-oil fuel is about 400° C., and the critical temperature of the DME fuel is about 127° C.

According to the first embodiment, the DME fuel in the tip end chamber 17 which is immediately before the injection is heated by the transmitted combustion heat, and the DME fuel is injected in the supercritical state.

In the case of light-oil fuel, since the critical temperature is too high, it is difficult to make the light-oil fuel into the supercritical state by using only the transmitted combustion heat. Even if it is possible to heat light-oil fuel inside the tip end chamber to have the critical temperature, the nozzle body 11 cannot withstand the heat for maintaining the hardness.

Therefore, the fuel in the tip end chamber 17 can be made into the supercritical state for the fuel injection nozzle 1 which uses the DME fuel as fuel. Further, in the present embodiment, in order to promote the heat transmission to the tip end chamber 17 from the combustion chamber C, the heat receiving portion 22 is provided to the fuel injection nozzle 1.

Thus, the DME fuel immediately before the injection is made into the supercritical state, so the DME fuel can be certainly injected in the supercritical state, although a phase change is easily generated in the DME fuel.

Moreover, it is not necessary to prepare an additional heat source to make the DME fuel into the supercritical state, since the DME fuel is just heated in the tip end chamber 17 using the combustion heat of the combustion chamber C, so a large-scale system is unnecessary.

Moreover, the DME fuel is maintained to have a liquid phase at the upstream of the seat part 20 in the flow of DME fuel, so a predetermined injection quantity is securable.

(Second Embodiment)

Figure 9:
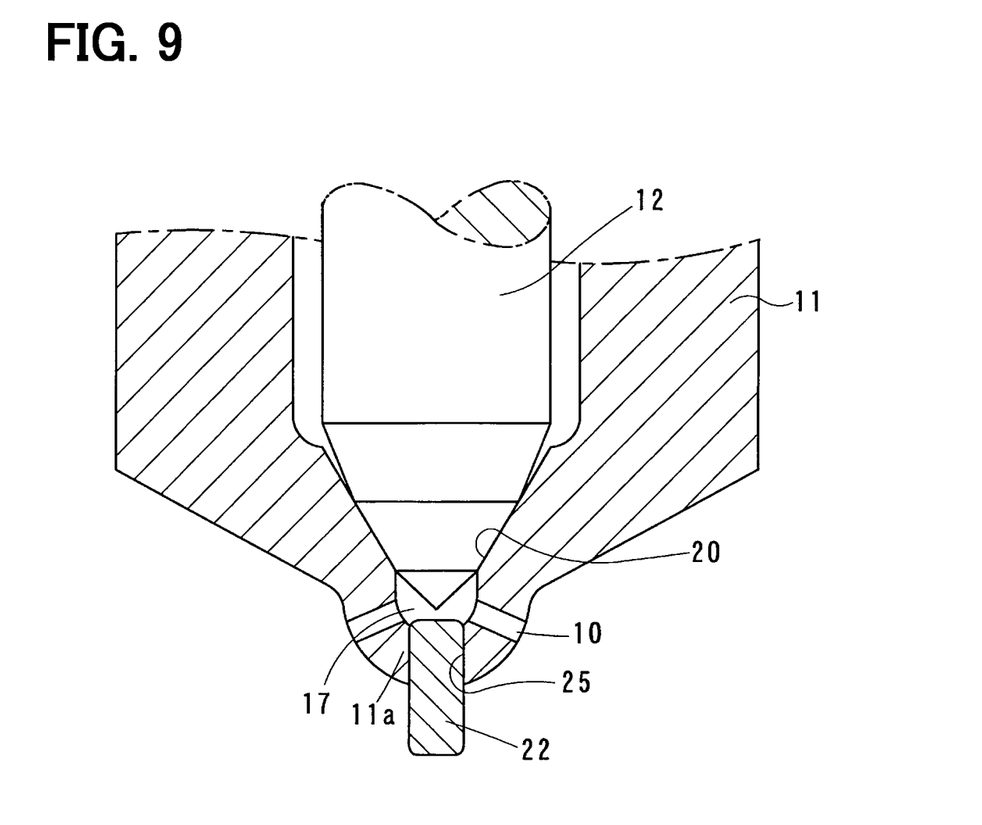
FIG. 9 is an enlarged sectional view illustrating a tip end of a fuel injection nozzle according to a second embodiment.

A second embodiment is described with reference to FIG. 9 in contrast to the first embodiment. A heat receiving portion 22 of the second embodiment is produced separately from the nozzle body 11 as another object. The heat receiving portion 22 is made with a material having a thermal conductivity higher than that of the nozzle body 11. The heat receiving portion 22 is attached to the nozzle body 11 in a manner that a part of the heat receiving portion 22 is exposed in the tip end chamber 17 and that a part of the heat receiving portion 22 is exposed in the combustion chamber C.

The nozzle body 11 is made with high carbon steel or chrome molybdenum steel. The heat receiving portion 22 is made with a material having a thermal conductivity which is higher than that of high carbon steel or chrome molybdenum steel.

For example, pure (malleable) iron material or tungsten is not melted even at the critical temperature of fuel, and the thermal conductivity of pure iron material or tungsten is high, so pure iron material or tungsten may be desirable as the material of the heat receiving portion 22.

The heat receiving portion 22 has, for example, a pillar shape. The tip end part 11a of the nozzle body 11 has a through hole 25, and the heat receiving portion 22 is pressingly fitted into the through hole 25 and is fixed by welding. The heat receiving portion 22 is assembled to the nozzle body 11 in a manner that a first end of the heat receiving portion 22 in the axial direction is exposed in the tip end chamber 17 and that a second end of the heat receiving portion 22 in the axial direction is exposed in the combustion chamber C.

Alternatively, the heat receiving portion 22 may be fixed inside the through hole 25 by ceramic-based adhesive.

According to the second embodiment, the heat transmission to the tip end chamber 17 is further facilitated, and it becomes easy to raise the fuel temperature to be higher than or equal to the critical temperature.

(Third Embodiment)

A third embodiment is described with reference to FIGS. 10A, 10B, 11A and 11B in contrast to the first embodiment. In the third embodiment, the fuel of the tip end chamber 17 is heated to be higher than or equal to the critical temperature not using the heat receiving portion 22. At least one of the plural injection holes 10 is a small-diameter hole 10A having a diameter smaller than those of the other holes, so that the combustion of fuel may be produced in an area adjacent to the tip end chamber 17. In other words, the outreach of the fuel injection from the small-diameter hole 10A is smaller than that from the others of the injections holes 10.

Figure 10A:
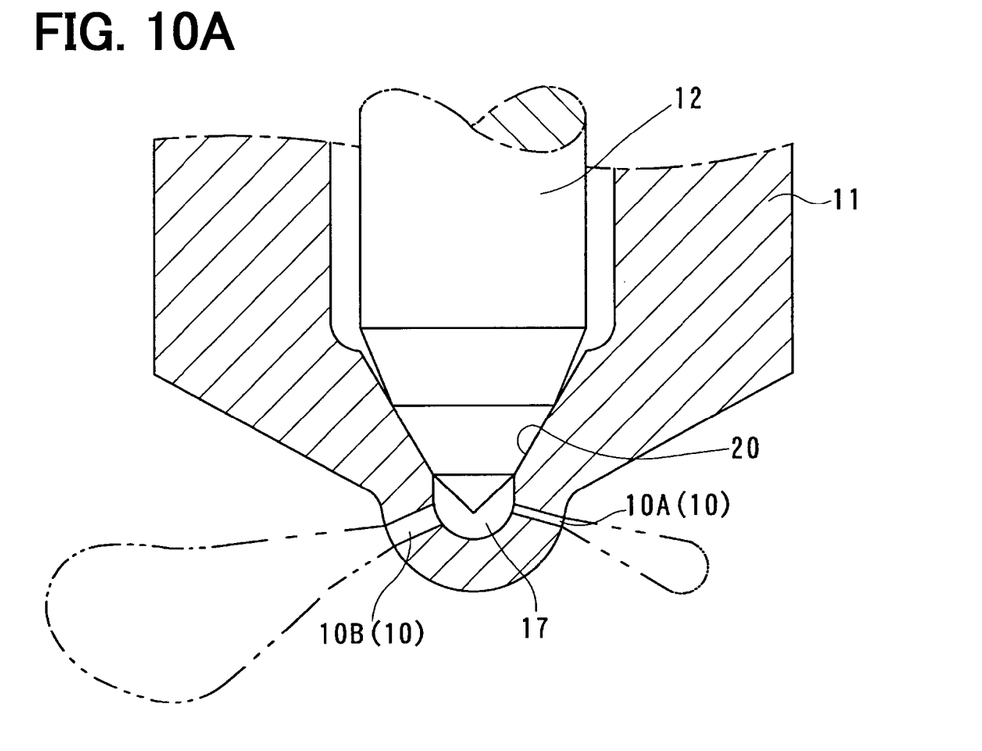
FIG. 10A is an enlarged sectional view illustrating a tip end of a fuel injection nozzle according to a third embodiment.
Figure 10B:
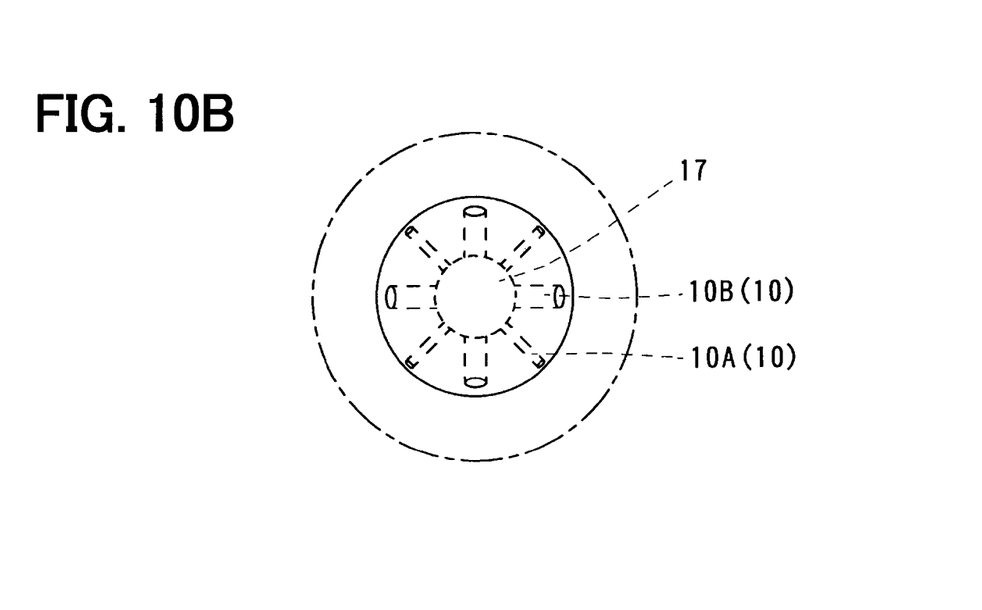
FIG. 10B is a bottom view illustrating the tip end of the fuel injection nozzle of the third embodiment.

Hereafter, the others of the injections holes 10 are referred as large-diameter hole 10B. The diameter of the large-diameter hole 10B is a normal size, and is larger than that of the small-diameter hole 10A. In the present embodiment, as shown in FIG. 10B, the small-diameter hole 10A and the large-diameter hole 10B are alternately arranged in the circumferential direction.

Figure 11A:
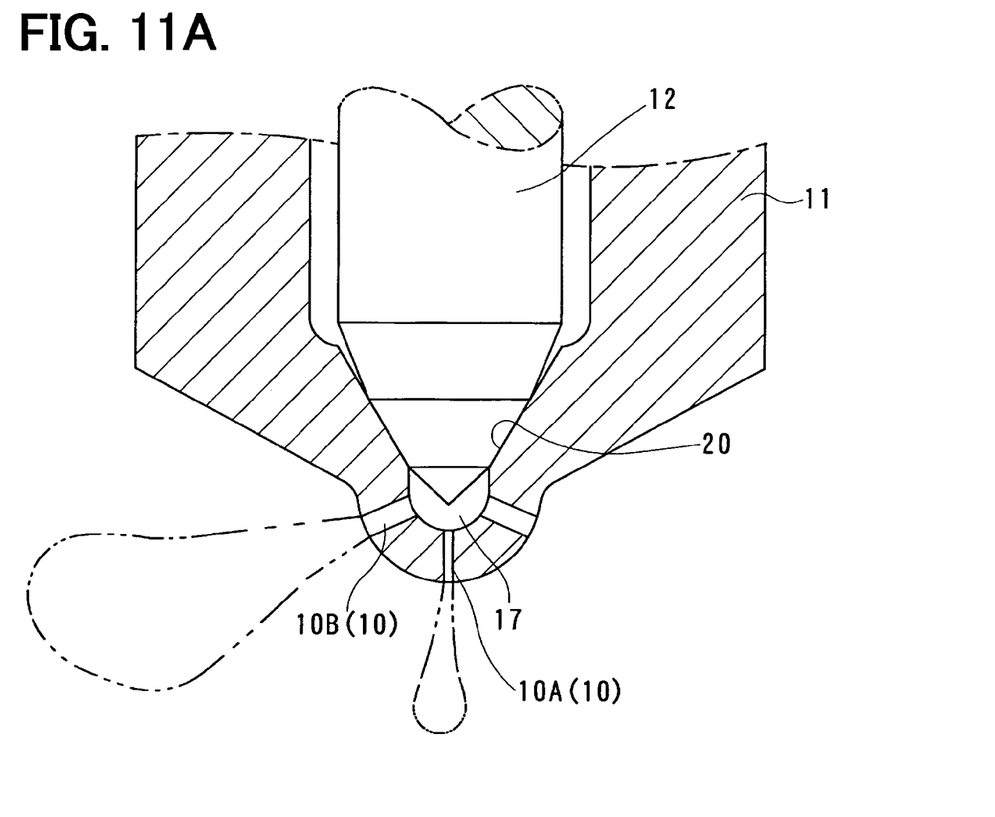
FIG. 11A is an enlarged sectional view illustrating a modification example of the fuel injection nozzle of the third embodiment.
Figure 11B:
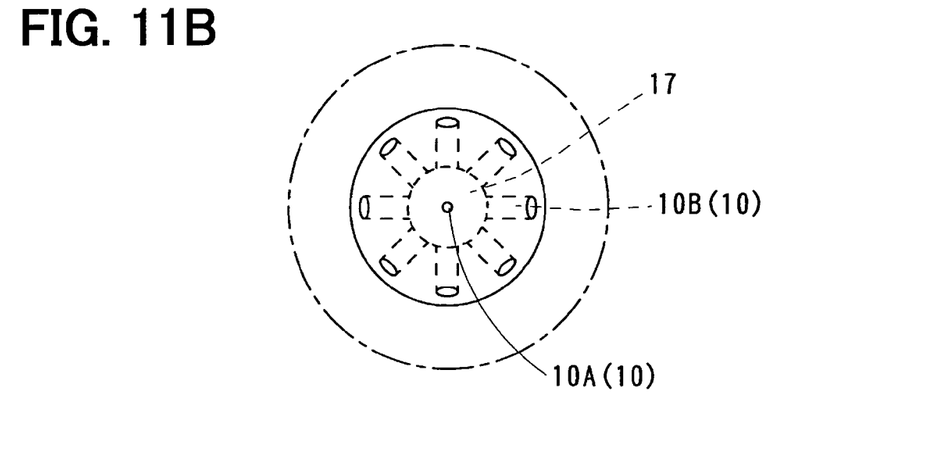
FIG. 11B is a bottom view illustrating the modification example of the fuel injection nozzle of the third embodiment.

Alternatively, as shown in FIGS. 11A and 11B, the number of the small-diameter hole 10A is one, and the one small-diameter hole 10A may be arranged to pass through the tip end part 11a of the nozzle body 11.

According to the third embodiment, since the fuel injected from the small-diameter hole 10A is combusted in an area adjacent to the fuel injection nozzle 1 (in an area adjacent to the tip end chamber 17), the heat receiving amount of the fuel injection nozzle 1 is increased and the heat transmission quantity to the fuel in the tip end chamber 17 is increased. As a result, it becomes possible to heat the fuel in the tip end chamber 17 to have a temperature higher than or equal to the critical temperature.

Therefore, similarly to the first embodiment, the DME fuel can be injected in the supercritical state certainly. Moreover, it is not necessary to prepare an additional heat source, so a large-scale system is unnecessary. Moreover, since the fuel is maintained to have liquid phase at the upstream of the seat part 20, a predetermined injection quantity is securable.

(Fourth Embodiment)

Figure 12:
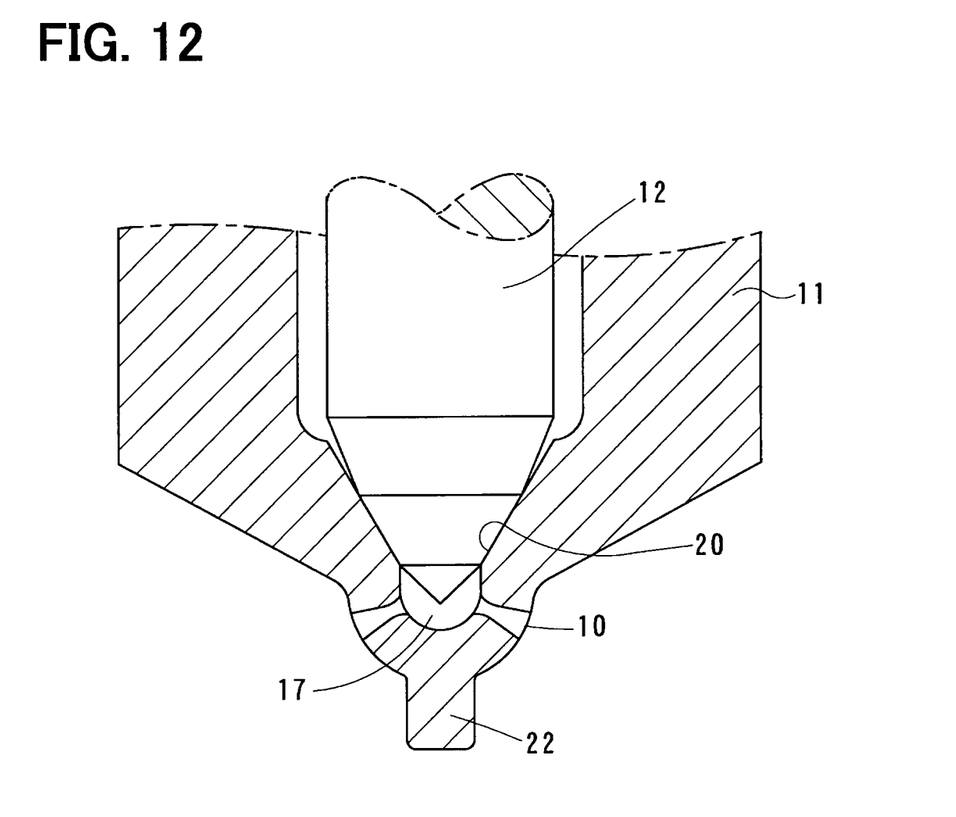
FIG. 12 is an enlarged sectional view illustrating a tip end of a fuel injection nozzle according to a fourth embodiment.

A fourth embodiment is described with reference to FIGS. 12 in contrast to the first embodiment. In the fourth embodiment, the injection hole 10 has a Laval nozzle shape. That is, a fuel inlet part of the injection hole 10 has a round or chamfered shape, so fuel can easily flow into the injection hole 10. Furthermore, the diameter of the injection hole 10 is made the minimum near the fuel inlet part, and is enlarged from the minimum part toward a fuel exit part.

The fuel in the supercritical state is a kind of compressive fluid, so the fuel in the supercritical sate can be injected at supersonic speed by forming the injection hole 10 into the Laval nozzle shape. Thereby, the fuel outreach distance can be increased and air in the combustion chamber C can fully be utilized.

In addition, the large-diameter hole 10B of the third embodiment may be also formed into the Laval nozzle shape.

(Modification)

The heat receiving portion 22 is not limited to project from the tip end part of the wall defining the tip end chamber 17. The heat receiving portion 22 may project from other position in the wall which defines the tip end chamber 17.

Moreover, the heat receiving portion 22 of the first embodiment or the second embodiment may be combined with the third embodiment. In this case, it becomes more easy to heat the tip end chamber 17, and the fuel temperature can be raised.

Such changes and modifications are to be understood as being within the scope of the present disclosure as defined by the appended claims.

What is claimed is:

1. A fuel injection nozzle through which fuel is injected into a combustion chamber of an internal combustion engine, the fuel being a DME fuel containing dimethyl ether as a main component, the fuel injection nozzle comprising:
   a nozzle body having a plurality of injection holes; and
   a needle accommodated in the nozzle body to open or close the plurality of injection holes, wherein
   the nozzle body has
      a seat part to which the needle seated or from which the needle separated, and
      a tip end chamber arranged downstream of the seat part in a flow of the DME fuel to communicate with the plurality of injection holes,
   the DME fuel in the tip end chamber is heated with combustion heat in the combustion chamber to have a supercritical state,
   at least one of the plurality of injection holes has a diameter which is smaller than a diameter of the other of the plurality of injection holes, the other of the plurality of injection holes being arranged around the at least one of the plurality of injection holes, the at least one of the plurality of injection holes is arranged to pass through a tip end part of the nozzle body and to extend on an axis of the nozzle body, fuel injected from the at least one of the plurality of injection holes is combusted in an area more adjacent to the tip end chamber than fuel injected from the other of the plurality of injection holes, the at least one of the plurality of injection holes is located at a center of the nozzle body in a radial direction, the other of the plurality of injection holes is arranged on an outer side of the one small hole in the radial direction at a fixed interval, the diameter of the at least one of the plurality of injection holes is constant from an end adjacent to the tip end chamber to the other end.

2. The fuel injection nozzle according to claim 1, further comprising:

a heat receiving portion projected from a tip end of the nozzle body toward the combustion chamber, wherein the heat receiving portion receives the combustion heat of the combustion chamber and transmits the combustion heat to the tip end chamber.

3. The fuel injection nozzle according to claim 2, further comprising:

the heat receiving portion is integrally formed with the nozzle body as one-piece element.

4. The fuel injection nozzle according to claim 2, wherein the heat receiving portion is formed separately from the nozzle body, the heat receiving portion is made of a material having a thermal conductivity which is higher than that of the nozzle body, and the heat receiving portion is assembled to the nozzle body such that a part of the heat receiving portion is exposed in the tip end chamber and that a part of the heat receiving portion is exposed in the combustion chamber.

5. The fuel injection nozzle according to claim 1, wherein the plurality of injection holes have a Laval nozzle shape.

6. The fuel injection nozzle according to claim 1, wherein the other of the plurality of injection holes has a Laval nozzle shape.

* * * * *